(12) United States Patent
Karthikeyan et al.

(10) Patent No.: US 10,855,601 B2
(45) Date of Patent: Dec. 1, 2020

(54) MODEL MANAGEMENT IN A DYNAMIC QOS ENVIRONMENT

(71) Applicant: BRITISH TELECOMMUNICATIONS PUBLIC LIMITED COMPANY, London (GB)

(72) Inventors: Vidhyalakshmi Karthikeyan, London (GB); Detlef Nauck, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 0 days.

(21) Appl. No.: 15/740,827

(22) PCT Filed: Jun. 30, 2016

(86) PCT No.: PCT/EP2016/065424
§ 371 (c)(1),
(2) Date: Dec. 29, 2017

(87) PCT Pub. No.: WO2017/001624
PCT Pub. Date: Jan. 5, 2017

(65) Prior Publication Data
US 2018/0198716 A1 Jul. 12, 2018

(30) Foreign Application Priority Data

Jun. 30, 2015 (EP) ..................... 15275166
Sep. 28, 2015 (EP) ..................... 15187163
(Continued)

(51) Int. Cl.
*H04L 12/851* (2013.01)
*H04L 12/24* (2006.01)
(Continued)

(52) U.S. Cl.
CPC .......... *H04L 47/24* (2013.01); *H04L 41/5009* (2013.01); *H04L 41/5022* (2013.01);
(Continued)

(58) Field of Classification Search
CPC ..... H04L 47/10; H04L 47/2441; H04L 47/30; H04L 47/32; H04L 12/5693
(Continued)

(56) References Cited

U.S. PATENT DOCUMENTS 5,995,490 A * 11/1999 Shaffer ................. H04L 47/801
348/14.08
6,154,778 A * 11/2000 Koistinen .......... H04Q 11/0478
370/230
(Continued)

FOREIGN PATENT DOCUMENTS

EP    1 016 261    7/2000
EP    1 374 486    1/2004
(Continued)

OTHER PUBLICATIONS

Maximizing Profit Using SLA-Aware Provisioning, Ananya Das, Math & Computer Science Department, Lake Forest College, Lake Forest, IL 60045, 2012 IEEE Network Operations and Management Symposium (NMOS,) 2012, (Year: 2012).*
(Continued)

*Primary Examiner* — Peter G Solinsky
*Assistant Examiner* — Sanjay K Dewan
(74) *Attorney, Agent, or Firm* — Nixon & Vanderhye PC

(57) ABSTRACT

The present invention provides a method of providing QoS models for a communications network in which: data is obtained data describing a plurality of QoS models, with each QoS model containing at least one QoS component specifying a characteristic of network traffic to be provided by the QoS model; monitoring network traffic to obtain a
(Continued)

plurality of indicators, each indicating a characteristic of the network traffic associated with one of the QoS models; selecting, based on the indicators, a subset of the plurality of QoS models; and providing data identifying the subset of QoS models to a client device to enable the client device to send data over the network according to a selected one of the subset of QoS models.

15 Claims, 9 Drawing Sheets

(30) Foreign Application Priority Data

Sep. 30, 2015 (EP) .................................... 15187813
Mar. 24, 2016 (EP) .................................... 16162451

(51) Int. Cl.
*H04L 12/927* (2013.01)
*H04L 12/725* (2013.01)
*H04L 12/26* (2006.01)

(52) U.S. Cl.
CPC .......... *H04L 43/062* (2013.01); *H04L 45/302* (2013.01); *H04L 47/805* (2013.01); *H04L 43/08* (2013.01)

(58) Field of Classification Search
USPC ...................................................... 370/235
See application file for complete search history.

(56) References Cited

U.S. PATENT DOCUMENTS

| | | | |
|---|---|---|---|
| 6,631,122 B1 * | 10/2003 | Arunachalam | ... H04L 29/06027 370/236.1 |
| 6,631,135 B1 | 10/2003 | Wojcik | |
| 6,690,929 B1 | 2/2004 | Yeh | |
| 7,263,065 B1 * | 8/2007 | Cahn | ...................... H04L 41/12 370/235 |
| 7,668,946 B1 | 2/2010 | Garcia-Franco et al. | |
| 7,715,312 B2 | 5/2010 | Khasnabishi | |
| 8,073,455 B1 | 12/2011 | Xie et al. | |
| 8,797,867 B1 | 8/2014 | Chen | |
| 10,200,914 B2 * | 2/2019 | Khawand | ............. H04W 28/24 |
| 2001/0013067 A1 | 8/2001 | Koyanagi et al. | |
| 2002/0010771 A1 * | 1/2002 | Mandato | ................. H04L 29/06 709/223 |
| 2002/0174227 A1 | 11/2002 | Hartsell | |
| 2003/0112762 A1 | 6/2003 | Hasan Mahmoud et al. | |
| 2003/0112766 A1 * | 6/2003 | Riedel | ...................... H04L 47/14 370/252 |
| 2003/0144822 A1 | 7/2003 | Peh | |
| 2004/0120705 A1 | 6/2004 | Friskney et al. | |
| 2004/0139088 A1 * | 7/2004 | Mandato | ................. H04L 29/06 |
| 2005/0083762 A1 | 4/2005 | Rui et al. | |
| 2005/0083849 A1 | 4/2005 | Rui et al. | |
| 2005/0102414 A1 | 5/2005 | Hares et al. | |
| 2006/0039380 A1 | 2/2006 | Cloonan | |
| 2006/0187817 A1 | 8/2006 | Charzinski et al. | |
| 2007/0230363 A1 | 10/2007 | Buskens et al. | |
| 2007/0268827 A1 | 11/2007 | Csaszar | |
| 2008/0008091 A1 | 1/2008 | Yumoto | |
| 2008/0065318 A1 | 3/2008 | Ho | |
| 2008/0104251 A1 | 5/2008 | Xu | |
| 2008/0232247 A1 | 9/2008 | Evans | |
| 2009/0191858 A1 | 7/2009 | Calisti | |
| 2009/0245130 A1 | 10/2009 | Bing | |
| 2010/0100525 A1 | 4/2010 | Huang | |
| 2010/0214920 A1 | 8/2010 | Tewani et al. | |
| 2010/0254265 A1 | 10/2010 | Kempe | |
| 2010/0265826 A1 | 10/2010 | Khasnabishi | |
| 2011/0044262 A1 | 2/2011 | Satapathy et al. | |
| 2011/0087522 A1 | 4/2011 | Beaty et al. | |
| 2013/0144550 A1 | 6/2013 | Czompo | |
| 2013/0275567 A1 | 10/2013 | Karthikeyan et al. | |
| 2013/0275589 A1 | 10/2013 | Karthikeyan et al. | |
| 2013/0311673 A1 | 11/2013 | Karthikeyan | |
| 2014/0046880 A1 | 2/2014 | Breckenridge | |
| 2014/0052850 A1 | 2/2014 | Doorhy et al. | |
| 2015/0074283 A1 | 3/2015 | Karthikeyan et al. | |
| 2015/0098338 A1 | 5/2015 | Bhattacharya | |
| 2015/0332155 A1 * | 11/2015 | Mermoud | .............. G06N 20/00 706/12 |
| 2015/0381648 A1 * | 12/2015 | Mathis | .................. H04L 41/145 726/22 |
| 2016/0171398 A1 | 6/2016 | Eder | |
| 2016/0344604 A1 | 11/2016 | Raleigh | |
| 2018/0191606 A1 | 7/2018 | Karthikeyan | |
| 2018/0191621 A1 | 7/2018 | Karthikeyan | |
| 2018/0191635 A1 | 7/2018 | Karthikeyan | |

FOREIGN PATENT DOCUMENTS

| | | | |
|---|---|---|---|
| EP | 1 401 161 | 3/2004 | |
| EP | 1 453 256 | 8/2005 | |
| EP | 1 248 431 | 10/2007 | |
| EP | 1 858 210 | 11/2007 | |
| EP | 1 993 231 | 11/2008 | |
| EP | 2 151 951 | 2/2010 | |
| EP | 2 261 811 | 12/2010 | |
| EP | 2 469 756 A1 * | 12/2010 | ............. H04L 12/24 |
| EP | 2 469 756 | 6/2012 | |
| EP | 1 875 693 | 8/2012 | |
| WO | 99/14931 | 3/1999 | |
| WO | 01/65779 | 9/2001 | |
| WO | 02/080458 | 10/2002 | |
| WO | 2006/116308 | 11/2006 | |
| WO | 2007/082918 | 7/2007 | |
| WO | 2011/076282 | 6/2011 | |
| WO | 2012/085520 | 6/2012 | |
| WO | 2012/085521 | 6/2012 | |
| WO | 2013/059683 | 4/2013 | |
| WO | 2013/144550 | 10/2013 | |
| WO | 2014/068268 | 5/2014 | |
| WO | 2014/068270 | 5/2014 | |
| WO | 2015/175260 A1 | 11/2015 | |
| WO | 2017/001628 | 1/2017 | |
| WO | 2017/001629 | 1/2017 | |

OTHER PUBLICATIONS

Worth-Based Multi-Category Quality-of-Service Negotiation in Distributed Object Infrastructure, Jari Koistinen, Aparna Seetharaman, Software Technology Laboratory, Hewlett Packard, HP, HPL-98-51 (R.1), Jul. 1998 (Year: 1998).*
International Search Report for PCT/EP2016/065424, dated Sep. 30, 2016, 3 pages.
International Search Report and Written Opinion of the International Searching Authority dated Sep. 30, 2016 issued in International Application No. PCT/EP2016/065424 (16 pgs.).
Search Report dated Nov. 30, 2016 issued in GB1605190.6 (6 pgs.).
Jari Koistinen and Aparna Seetharaman, Worth-Based Multi-Category Quality-of-Service Negotiation in Distributed Object Infrastructures, Software Technology Laboratory, Hewlett Packard, Jul. 1998 (18 pgs.).
Advisory Action dated Aug. 2, 2019 issued in U.S. Appl. No. 15/740,837 (4 pgs.).
Advisory Action dated Aug. 2, 2019 issued in U.S. Appl. No. 15/740,832 (4 pgs.).
Balaraman, "Business Data Mining and Decision Making Application of Data Mining in the Telecommunication Industry" Term paper, Quantitative Methods & Information Systems, Indian Institute of Management Bangalore, Oct. 22, 2011 (23 pages).
European Office Action dated May 20, 2019, issued in EP No. 16 733 095.0 (9 pages).
Extended European Search Report dated Nov. 26, 2015 issued in European Application No. 15275166.5 (5 pgs.).

(56) References Cited

OTHER PUBLICATIONS

GB Search Report issued in GB1517349.5, dated May 26, 2016 (6 pages).
International Search Report and Written Opinion issued in PCT/EP2016/065434 dated Oct. 6, 2016 (15 pages).
International Search Report and Written Opinion of the International Searching Authority dated Sep. 5, 2016 issued in International Application No. PCT/EP2016/065429 (16 pgs.).
International Search Report and Written Opinion of the International Searching Authority dated Sep. 23, 2016, issued in International Application No. PCT/EP2016/065431 (13 pages).
Jari Koistinen and Aparna Seetharaman, "Worth-Based Multi-Category Quality-of-Service Negotiation in Distributed Object Infrastructures", Hewlett-Packard Laboratories, Jul. 1998 (11 pgs.).
Krishna Kumar Balaraman, "Application of Data Mining in the Telecommunication Industry", Term Paper, Indian Institute of Management Bangalore, Oct. 22, 2011 (23 pgs.).
Zoubir Mammeri, "Principles and Mechanisms for Quality of Service in Networks", Chapter 2, Published Feb. 2, 2010 (33 pgs.).
Office Action dated Apr. 19, 2019 issued in U.S. Appl. No. 15/740,837 (14 pgs.).
Office Action dated Apr. 19, 2019 issued in U.S. Appl. No. 15/740,832 (12 pgs.).
Office Action dated May 23, 2019, issued in EP Application No. 16 734 360.7 (9 pgs.).
Office Action dated May 30, 2019 issued in U.S. Appl. No. 15/740,520 (16 pgs.).
Office Action dated Nov. 2, 2018 issued in U.S. Appl. No. 15/740,520 (13 pgs.).
Office Action dated Oct. 17, 2018 issued in U.S. Appl. No. 15/740,837 (11 pgs.).
Office Action dated Oct. 17, 2018 issued in U.S. Appl. No. 15/740,832 (11 pgs.).
Search Report dated Apr. 27, 2016 issued in GB1517110.1 (7 pages).
Tanja Zseby and Sebastian Zander, "Sampling Schemes for Validating Service Level Agreements", Centre for Advanced Internet Architectures, CAIA Technical Report 040706A, Jul. 2004 (6 pgs.).
U.S. Appl. No. 15/740,520, filed Dec. 28, 2017 (30 pgs.).
U.S. Appl. No. 15/740,832, filed Dec. 29, 2017 (29 pgs.).
U.S. Appl. No. 15/740,837, filed Dec. 29, 2017 (33 pgs.).
Valikannu "A Novel Energy Consumption Model using Residual Energy Based Mobile Agent Selection Scheme (REMA) in MANETs" 2015 $2^{nd}$ International Conference on Signal Processing and Integrated Networks (SPIN), Noida, India. Pub., IEEE, Feb. 19-20, 2015 (6 pages).
Zhengdong Gao and Gengfeng Wu, "Combining QoS-based Service Selection with Performance Prediction", School of Computer Engineering and Science, Shanghai University, Proceedings of the 2005 IEEE International Conference on e-Business Engineering (ICEBE'05); 2005 (4 pgs.).
International Search Report of PCT/EP2016/065429, dated Sep. 5, 2016, 4 pages.
Examination Report issued in EP Application No. 16 733 597.5 dated Sep. 12, 2019 (9 pages).
Ananya Das "Maximizing Profit Using SLA-Aware Provisioning", 2012 IEEE Network Operations and Management Symposium (NOMS), Math & Computer Science Department, Lake Forest College, Apr. 16, 2012 (8 pages).
Office Action dated Nov. 13, 2019 issued in U.S. Appl. No. 15/740,832 (12 pages).
Office Action dated Nov. 13, 2019 issued in U.S. Appl. No. 15/740,837 (11 pages).
Advisory Action dated Oct. 8, 2019, issued in U.S. Appl. No. 15/740,520 (3 pages).
Office Action dated Mar. 4, 2020 issued in U.S. Appl. No. 15/740,520 (19 pgs.).

* cited by examiner

| Prototype Vector | Jitter | Loss | Delay |
|---|---|---|---|
| $p_1$ | 3.01 | 0.1506 | 24.82 |
| $p_2$ | 4.00 | 0.1003 | 29.76 |
| $p_3$ | 2.50 | 0.1995 | 19.90 |

Fig. 2A

| Confidence Vector | Jitter | Loss | Delay |
|---|---|---|---|
| $c_1$ | 0.0280 | 0.0015 | 0.2193 |
| $c_2$ | 0.0395 | 0.0008 | 0.2235 |
| $c_3$ | 0.0211 | 0.0017 | 0.1905 |

Fig. 2B

| Base Data | | | | Global Statistics | | | | |
|---|---|---|---|---|---|---|---|---|
| ID | Prototype | Global Confidence | Created | Capacity [Mb/s] | Routes | Peak Flows | Peak Demand [Mb/s] | 1hr Flows | ... |
| 1 | (3.1, 0.1521, 25.15) | (0.0280, 0.0015, 0.2193) | 20/03/2014 12:00 | 200 | 3 | 24 | 153 | 13 | ... |
| 2 | (4.00, 0.1003, 29.76) | (0.0395, 0.0008, 0.2235) | 20/03/2014 14:00 | 150 | 3 | 0 | 0 | 0 | ... |
| 3 | (2.50, 0.1995, 19.90) | (0.0211, 0.0017, 0.1905) | 20/03/2014 14:00 | 300 | 3 | 0 | 0 | 0 | ... |
| ... | ... | ... | ... | ... | ... | ... | ... | ... | ... |

Fig. 2C

| Base Data | | | | | Route-based Statistics | | |
|---|---|---|---|---|---|---|---|
| Route | Model ID | Route Confidence | Active since | Capacity [Mb/s] | Peak Flows | Peak Demand [Mb/s] | ... |
| 1 | 1 | (0.0280, 0.0015, 0.2193) | 20/03/2014 12:00 | 100 | 8 | 82 | |
| 2 | 1 | (0.0280, 0.0015, 0.2193) | 20/03/2014 12:00 | 50 | 9 | 48 | |
| 3 | 1 | (0.0280, 0.0015, 0.2193) | 20/03/2014 12:00 | 50 | 7 | 23 | |
| 4 | 2 | (0.0395, 0.0008, 0.2235) | 20/03/2014 14:00 | 200 | 0 | 0 | ... |
| ... | ... | ... | ... | ... | ... | ... | ... |
| 9 | 3 | (0.0211, 0.0017, 0.1905) | 20/03/2014 14:00 | 100 | 0 | 0 | ... |
| ... | ... | ... | ... | ... | ... | ... | ... |

| Model ID | Time | Breaches | Better | Within | Drifted | Volatile |
|---|---|---|---|---|---|---|
| ... | ... | ... | ... | ... | ... | ... |
| 1 | 15:00 | 0 | 3 | 12 | 0 | 0 |
| 1 | 16.00 | 2 | 5 | 5 | 0 | 1 |
| ... | ... | ... | ... | ... | ... | ... |

Figure 6

| Model | Routes | Avg. data amount[GB]/h | Avg. data amount per route/h | % traffic congested |
|---|---|---|---|---|
| M1 | 10 | 100 | 10 | 10% |
| M2 | 2 | 30 | 15 | 5% |
| M3 | 12 | 120 | 10 | 15% |
| M4 | 20 | 100 | 5 | 20% |
| M5 | 15 | 60 | 4 | 5% |
| M6 | 5 | 20 | 4 | 10% |

MODEL MANAGEMENT IN A DYNAMIC QOS ENVIRONMENT

This application is the U.S. national phase of International Application No. PCT/EP2016/065424 filed 30 Jun. 2016 which designated the U.S. and claims priority to EP Patent Application No. 15275166.5 filed 30 Jun. 2015, EP Patent Application No. 15187163.9 filed 28 Sep. 2015, EP Patent Application No. 15187813.9 filed 30 Sep. 2015, and EP Patent Application No. 16162451.5 filed 24 Mar. 2016, the entire contents of each of which are hereby incorporated by reference.

TECHNICAL FIELD

The present disclosure relates to network communications, and in particular to routing in packet switched networks, and still more particularly to the routing of packets and the provision of Quality of Service, QoS, for packets transmitted over a computer network.

BACKGROUND

As the volume of traffic transmitted on packet switched networks has increased, and the types of traffic transmitted over such networks has broadened to include traffic types that rely upon low latency transmission over the network, such as voice or streaming media, it has become increasingly important to enable proactive management of the traffic on the network.

Quality of service models enable differentiated handling of different types of network traffic. The integrated services, Intserv, architecture is designed to guarantee a particular quality of service for the transmission of a stream of packets across a network. Prior to transmission of a stream of packets, Intserv requires that an originating network component reserves resources in each router through which the stream of packets will pass. This resource reservation, usually requested using RSVP (Resource Reservation Protocol), ensures that each router in the path has the necessary resources to guarantee transmission of the packet stream at a particular QoS prior to transmission of the packet stream. However, the IntServ system does not scale easily, since it quickly becomes difficult for the network components to manage the reservations.

An alternative approach is the differentiated services, Diffserv, computer networking architecture enables the network to classify the traffic into one of a specified and predetermined number of traffic classes. A differentiated services, DS, field is populated in each packet transmitted across the network and the field indicates to the network the quality of service, QoS, that is to be provided to that packet in its transmission between network components. The DiffServ model can be used to provide low-latency transmission of critical network traffic, such as streaming packets or voice-over-IP packets, across a network. Packets not marked with a prioritised packet code, such as email and web traffic, can be transmitted when the network components have capacity to do so.

SUMMARY

The present disclosure relates to methods and apparatus for selecting the quality of service models which are to be offered for use in a network. Aspects and examples of the invention are set out in the claims.

Described herein are methods of providing Quality of Service, QoS, models for use in a network, and for selecting between models which are being offered so as to reduce their number where appropriate. In networks in which QoS models are discovered based on monitoring of route performance, for example based on clustering of routes, QoS models may proliferate undesirably. In such a dynamic QoS environment, embodiments of the disclosure enable network operators to choose between discovered QoS models to manage and, where necessary, to reduce the number of those QoS models being offered for use at any given time.

One such method of providing Quality of Service, QoS, models comprises: obtaining data describing a plurality of QoS models, each QoS model comprising at least one QoS component specifying a characteristic of network traffic to be provided by the QoS model; monitoring network traffic to obtain a plurality of indicators, each indicating a characteristic of the network traffic associated with a corresponding one of the plurality of QoS models; selecting, based on the plurality of indicators, a subset of the plurality of QoS models; and providing data identifying the subset of QoS models to a client device to enable the client device to send data over the network according to a selected one of the subset of QoS models. This may enable certain QoS models to be withdrawn, for example if the monitoring indicates that the routes associated with the model are not providing QoS at the level promised by the model. The indicators used in these methods may comprise one or more of: stability indicators, volatility indicators and performance indicators.

It will be appreciated in the context of the present disclosure that in the process of negotiating QoS between a client and a network Gatekeeper a query message may be received from the client specifying one or more quality-of-service (QoS) requirements for the transport of a data flow. Methods according to the disclosure may comprise transmitting a first query response message to the client identifying the QoS models available at the time. This can enable the client to select from amongst those QoS models for the transport of a data flow through the network.

Later, after that data flow of network traffic has been monitored, and a subset of QoS models have been selected as explained above, some of the previously available QoS models may be withdrawn (for example being excluded from the subset). As a result, when a further query is received from a client, a second query response message may be sent identifying the QoS models available at the time of the further query. It will therefore be appreciated that providing data identifying the subset of QoS models may comprise responding to the query message by transmitting a query response comprising QoS models selected only from the subset of QoS models and excluding other, previously available models.

At the time a QoS model is offered, it may be offered with a service level agreement (SLA) of some kind, such as a confidence interval indicating the spread of the QoS components that a client can expect to be provided by the QoS model. For example, a QoS model, P, may be associated with a performance envelope p±c, where p is a vector of values specifying the model prototype and c is a confidence vector indicating the expected variation in the QoS components specified by the model prototype p. To monitor SLA breaches, the indicators obtained from the monitoring may each comprise the number of routes that deviate from the QoS model with which they are associated by more than a selected threshold deviation. This threshold may be based on the confidence vector associated with the corresponding QoS model. Such indicators may provide an indication of the number of routes which breach the service level agreement (SLA) for the QoS model. This may be done by computing the time average QoS vector q for each traffic flow assigned to a QoS model P. It can then be determined whether the time average of the QoS vector q lies within a confidence interval of the model prototype, and if not how many flows have a time average q which breaches the performance envelope, p±c, specified by the model and it's confidence interval. Other agreed performance envelopes may be used to determine whether the traffic flows assigned to that model match expectations for the QoS model, or if there has been an SLA breach. If more than a selected number of routes breach the SLA, the model may be deemed no longer to be available, and so be withdrawn from advertisement in query response messages. This may be done by excluding it from the subset of QoS Models that are to be offered for use in query response messages transmitted from the gatekeeper.

The ability to provide performance which complies with a QoS model may be dependent on the traffic flow characteristics of the routes associated with that QoS model. To monitor these characteristics for the QoS model as a whole, the indicators may also comprise the characteristic of the network traffic aggregated over a plurality of flows of network traffic associated with the QoS model, P. For example, the average QoS vector, Q, may be computed over some or all flows for a QoS model. It can then be determined whether these computed values, calculated across the actual traffic flows of the network which are attributed to that QoS model, lie within the confidence interval specified by the QoS model itself. If that is not the case we consider the prototype of the QoS model, P to have drifted away and so the model can be withdrawn from advertisement in query response messages.

Another characteristic of the actual traffic flows attributed to a model is their ability to provide defined performance. Just as the average QoS, Q, may be calculated across a plurality of flows, a confidence vector, $c_q$, may be determined from the spread (e.g. the variance) of QoS performance computed from the monitored traffic flows. The values in this confidence vector may be used to provide an indication of the stability of the QoS model. One way to achieve this may be by determining whether confidence vector, $c_q$, determined from the monitored flows exceeds an expected threshold. For example, the expected threshold may be based on the model prototype, p. For example, the threshold for each component of the confidence vector may be a selected fraction of the model prototype. In other words, in the event that the confidence vector, $c_q$, calculated from the traffic flows exceeds some permitted fraction of the model prototype, p it may be withdrawn from advertisement in query response messages.

Stability indicators may also be used to determine which QoS models to include in the subset of models that are advertised in query response messages at the gatekeeper. Such stability indicators may be determined by comparing the monitored network traffic with the corresponding one of the plurality of QoS models, for example by counting the number of times a difference between the actual performance of a monitored traffic flow exceeds an expected deviation associated with the QoS model. This may be done over a particular time interval, for example the count may provide a measure of the frequency of SLA breaches. This measure of stability may be aggregated over all flows of the QoS model and/or over all components specified by the model.

In an embodiment the monitoring comprises collecting data about a plurality of flows of network traffic associated with each of the plurality of QoS models. In an embodiment the indicator comprises a value of the characteristic specified by the each QoS model, the value being determined based on the collected data. In an embodiment the method comprises determining, based on the data, a QoS vector qi for each of the plurality of flows assigned to that QoS model, and determining an average QoS vector Q for that QoS model based on an average of the QoS vectors qi for each of the plurality of flows. In an embodiment the method comprises determining whether to exclude that QoS model from the subset based on whether the average QoS vector Q lies within a confidence interval associated with that QoS model. In an embodiment the method comprises determining, based on the QoS vectors, $q_i$, for each of the plurality of flows, a confidence vector cq and determining whether to exclude that QoS model from the subset based on one or more components of this confidence vector $c_q$. The determining whether to exclude may be based on comparing the one or more components of the confidence vector with a corresponding component of that QoS model, for example comparing the one or more components of the confidence vector with a selected fraction of the corresponding component of that QoS model. The embodiments outlined above may be directed to the issue of managing model performance, and withdrawing those models whose performance does not match SLAs.

Other embodiments are directed to the issue of how to promote desirable characteristics of network traffic. One such method comprises providing QoS models for use in a network that are selected so as to promote such desirable traffic. For example, a network operator may wish to use the performance models which promote desired traffic. This may be done by ranking performance models based on any feature that identifies such desired traffic. Each traffic flow that is mapped to a QoS model can be characterised by such a feature, for example, revenue, energy usage, type of traffic or application (if packet inspection is available), disruptive behaviour (e.g. sending more than agreed), congestion, duration of transmission, amount of data transmitted etc. By aggregating these values by model and route and/or by model only, a measure can be obtained for each model on each route or just for each model. The models can then be sorted based on this measure such that models supporting desired traffic appear at the top of the list. The operator can then decide to use a threshold or select the top N models and mark the remaining models as inactive or redistribute resources to the top models.

One such method of providing QoS models comprises: obtaining data describing a plurality of QoS models, each QoS model comprising at least one QoS component specifying a characteristic of transport of network traffic to be provided by the QoS model; obtaining a plurality of first desirability indicators, each indicating a desirability of the network traffic associated with a corresponding one of the plurality of QoS models; selecting a subset of the plurality of QoS models based on the first desirability indicators; and providing data identifying the subset of QoS models to a client device to enable the client device to send data over the network according to a selected one of the subset of QoS models.

The first desirability indicators may each be determined based on monitoring the network traffic associated with the corresponding QoS models. Such desirability indicators may be based on a cost (such as an energy, resource, or revenue cost) associated with the corresponding one of the plurality of QoS models. They may also be based on an aggregate determined for some or all flows in the network which are associated with a QoS model. These desirability indicators may be used to determine which QoS models are to be advertised in query response messages sent to clients, and which are to be withdrawn from use (for example by no longer being advertised).

More than one desirability indicator may be used to make this assessment. For example, the method may comprise determining a second desirability based on a different desirability indicator metric than the first desirability indicator. These indicators may be numeric indicators, and may be combined so as to attach selected weightings to each of the different desirability metrics. Where non-numeric indicators are used they can be combined using logical operations, or converted to numeric values. This may be used to promote QoS models having particular characteristics.

The desirability indicators may be fixed, or may be updated based on external data associated with network conditions or the cost of resources associated with the QoS models, and/or they may be determined based on the monitoring of network traffic. For example, they may be based on a count of events or based on time averages determined from monitoring of traffic during a selected time interval.

The desirability indicators may be determined based on at least one of: an identifier of a client associated with the network traffic; and secondary data assigned to the network traffic. The secondary data comprises at least one of: a metric of adverse impact to other services; a metric of the stability of routes followed by that traffic through the network; an amount of data communicated by the network traffic; a congestion indicator; and a cost metric. The congestion indicator may be based on detecting the number of congestion events. Congestion events may be defined as a greater than threshold packet delay, or a greater than threshold percentage of packet loss.

In an embodiment the method comprises using both a desirability indicator and a performance indicator. Accordingly, the method may comprise monitoring network traffic to obtain a plurality of performance indicators, each indicating a characteristic of the network traffic associated with a corresponding one of the plurality of QoS models. This performance indicator may then be used to select the subset of models that are to be advertised at the gatekeeper. For example, the subset may be selected by making a selection based on the performance indicators before making the further selection based on the desirability indicators, for example wherein each selection comprises excluding at least one of the plurality of QoS models from the subset.

The performance indicator may comprise a number of routes associated with the corresponding QoS model having a characteristic which deviates from the corresponding QoS model by more than a selected threshold deviation. For example, the threshold deviation may be selected based on a confidence vector associated with corresponding QoS model. A QoS model may be withdrawn (e.g. excluded from the subset) in the event that it comprises more than a certain number of routes which exceed the threshold deviation.

In an aspect there is provided a method of providing Quality of Service, QoS, models for use in a network, the method comprising: obtaining data describing a plurality of QoS models, each QoS model specifying at least one QoS component to be applied to transport of network traffic; identifying a first QoS model comprising at least one QoS component which matches a component specified by a second QoS model; replacing the first QoS model and the second QoS model with a single QoS model based on at least one of: the first QoS model; and the second QoS model; and providing the replacement QoS model and remaining ones of the plurality of QoS models to a client device to enable the client device to send data over the network according to this subset of QoS models.

In an embodiment the replacement QoS model comprises the matching QoS components (e.g. those QoS components which are common to both the first QoS model and the second QoS model).

In an embodiment the method comprises receiving a plurality of requests for QoS, and determining, based on these requests, demand statistics for at least one QoS component; determining, based on the demand statistics, a redundant QoS component; wherein the identifying a first QoS model comprises identifying a QoS model which specifies the redundant QoS component. For example, the second QoS model may specify the redundant QoS component.

In an embodiment the method comprises identifying QoS models which offer the redundant component, and pruning (e.g. deleting) the redundant component from those QoS models. In addition to simplifying the models to remove redundant components, the method may comprise using desirability and/or performance indicators to select the subset of QoS models that are to be advertised in query response messages. For example, in an embodiment the method further comprises: monitoring network traffic to obtain a plurality of performance indicators, each indicating a performance characteristic of the network traffic associated with a corresponding one of the plurality of QoS models; wherein the subset of QoS models is selected based at least partially on the performance indicators. The subset of QoS models may be selected by making a selection based on the performance indicators before determining whether to replace QoS models specifying at least one matching QoS component. The performance indicator may comprise a number of routes associated with the corresponding QoS model having performance which deviates from the corresponding QoS model by more than a selected threshold deviation. Any of the other indicators described herein may also be used, and they may be applied to the selection of QoS models in any sequence.

Embodiments of the disclosure provide network devices configured to perform any one or more of the methods described herein. Examples of such network devices include a Gatekeeper, an edge router, and any network device capable of processing and routing packets. Such a device may comprise a communication interface for sending and receiving messages, some data storage for storing routing information, QoS models and QoS related data and a processor configured to perform any one or more of the methods described herein.

Embodiments of the disclosure also provide tangible non transitory computer readable media storing computer readable instructions configured to program a processor of a network device to perform any one or more of the methods described herein. Embodiments of the disclosure also provide computer program products comprising program instructions configured to program a processor of a network device to perform the method of any preceding claim.

BRIEF DESCRIPTION OF DRAWINGS

FIGS. 2A and 2B give examples of QoS feature vectors and confidence vectors that may be used to define QoS models;

FIGS. 2C and 2D give examples of tables comprising QoS model information and model-to-route mapping information;

FIG. 4 illustrates an example of performance data which may be used by a method such as that described with reference to FIG. 3 to select QoS models to be provided in a network;

FIG. 6 illustrates an example of desirability indicator data which may be used by a method such as that described with reference to FIG. 5 to select QoS models to be provided in a network;

SPECIFIC DESCRIPTION

Figure 1:
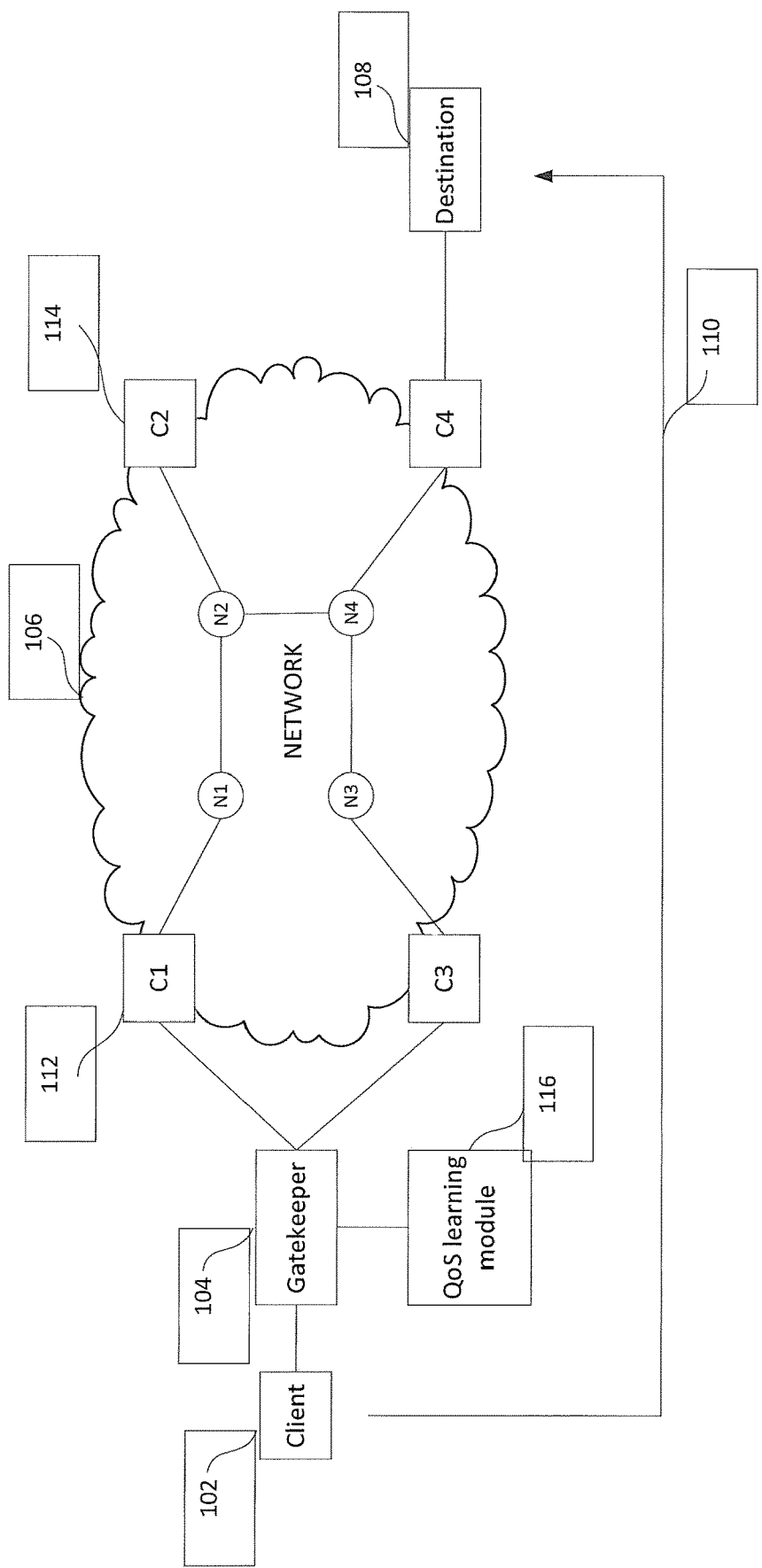
FIG. 1 illustrates a system for transmission of data flows across a network based on negotiated quality of service (QoS) metrics.

FIG. 1 illustrates a network 106 and an apparatus comprising a Gatekeeper 104, and a QoS Learning Module 116. A client 102, e.g. an entity wishing to send a flow of data, is coupled to a destination 108 by the apparatus 104, 116, and the network 106.

The apparatus 104, 116 and the network 106 are arranged to advertise a set of available QoS models to a client 102 to enable the client 102 to select from amongst those QoS models. The packets of the client's data flow 110 can then be labelled with an indicator of their selected QoS model (for example by using a differentiated services, DS, field of the packet). The network is configured so that those packets will then be transported through the network 106 according to that QoS model.

The Gatekeeper 104 is configured to provide an interface between the network and the client 102 (a user wishing to send traffic across the network). This interface may allow the client 102 to negotiate desired transport parameters for the traffic they wish to send. In this regard, the Gatekeeper 104 is configured to provide "scoreboard" data to clients. This "scoreboard" data advertises the available QoS models, and identifies the Differentiated Services Code Point, DSCP, values which are used to identify the routes through the network which offer performance according to each of those QoS models. The Gatekeeper 104 may be provided at an edge router, a session admission unit, a bandwidth broker or at a network installed generic interface between a client 102 site and the network itself.

Embodiments described with reference to FIG. 1 may enable the QoS models advertised to the client 102 by the Gatekeeper 104 to be kept up-to-date. This may be done by removing QoS models from the advertisement provided to clients if (a) the actual performance of the QoS model does not match the QoS specified by the model; and/or (b) if other QoS models are more 'desirable'; and/or (c) if there is redundancy between QoS models.

FIG. 1 shows a network comprising a number of edge nodes C1-C4 and internal nodes N1-N4. The edge nodes are coupled together via the network, for example via the internal nodes N1-N4. The edge nodes C1-C4 are also arranged to provide communications to and from the network. The network can thus provide various routes for carrying network traffic (e.g. data flows) between pairs of edge nodes C1-C4. These routes may pass through one or more of the internal nodes N1-N4. For example, a first route from a first edge node C1 may pass through a first group of nodes to reach a second edge node C2 whilst a second route from that first edge node C1 may pass through a second group of nodes to reach the second edge node C2. The second group of nodes may be different from the first group of nodes. For example, the first route may be C1-N1-N2-C2, and the second route may be C1-N1-N2-N4-C4-C2 etc. As will be appreciated by the skilled person in the context of the present disclosure, more than two such routes may be available between any pair of edge nodes. Each of these routes may have different performance characteristics, for example in terms of packet loss or delay. The performance characteristics of any given route may vary over time—for example performance characteristics may be dependent upon time-varying network conditions such as power availability and network load. When the client 102 wishes to send traffic across the network it obtains data identifying the available QoS models from the Gatekeeper 104. The client 102 can then select a QoS model according to the needs of the traffic it wishes to send and obtain, from the Gatekeeper 104, a DSCP value which can be used in the network to identify that QoS model. The client 102 then sets a differentiated services, DS, field in each packet based on this DSCP value before sending the packets across the network. The DS field indicates the QoS model that is to be applied to that packet in its transmission between network components.

The network is configured to provide data transmission in accordance with various distinct Quality of Service (QoS) models. Each QoS model in effect defines a Class of Service (CoS) that may be applied to traffic transported on the network. QoS models define bounds on various QoS metrics, such as packet loss. For example, one QoS model may define a particular maximum value for packet loss whilst another may specify a maximum packet delay. A single model may also combine multiple QoS metrics, such as packet loss, packet delay and jitter. Some QoS models may be predefined. For example, the network may provide a standard set of DiffServ classes of service such as Default PHB (typically best-effort traffic), Expedited Forwarding (EF) PHB (low-loss, low-latency traffic) and Assured Forwarding (AF) PHB (where PHB denotes per-hop-behaviour).

In a general mode of operation of the network illustrated in FIG. 1, each time a client wishes to transport a data flow through the network it sends a query message to the Gatekeeper 104. The query message specifies one or more QoS requirements—the QoS constraints that the client wishes to be applied to a traffic flow. The Gatekeeper 104 identifies QoS models matching the identified requirements, and provides information about the matching models in a response message to the client. If required, the query and response may be repeated one or more times, for example the client may revise its requirements based on the QoS models available to it. The client can then send a reservation message to the Gatekeeper 104. The reservation message identifies one or more of the available QoS models to select those models for the data flow. The Gatekeeper 104 then identifies and reserves (if possible) network resources for the data flow based on the selected QoS model(s). This may involve identifying suitable network routes and allocating bandwidth on those routes. The Gatekeeper 104 also allocates a distinct CoS identifier for the data flow and sends a response to the client indicating the allocated CoS identifier. The CoS identifier (e.g. in the form of a DSCP as discussed below) is subsequently used by the client to label traffic for the data flow. The Gatekeeper 104 or another network component (e.g. edge router) receiving data packets for the flow labelled with the CoS identifier, can then identify the agreed QoS metrics and/or allocated resources for the packets from the CoS identifier and route them through the network accordingly. It can thus be seen that the apparatus 104, 116 is arranged to receive a query message from a client requesting transport of a data flow through the network with a particular QoS model.

Not all QoS models need be predefined. The QoS Learning Module 116 (also referred to as a performance modeler, PM) may be configured to classify traffic routes through the network into one of a selected number of clusters. The QoS Learning Module 116 can also assign DSCP value to a cluster of such routes, and determine a QoS model that describes transport along that cluster of routes. Each cluster of routes may thus be described by a QoS model, and identified by a DSCP value. This so-called "cluster driven" approach to assigning QoS models is discussed in more detail below.

In a "cluster-driven" approach, QoS models may be identified by discovering cluster centres by monitoring route performance. Such monitoring can identify routes which share common performance features (e.g. similar packet delay). Where such performance features are common to a plurality of routes in the network, they can be grouped into a "cluster", and the QoS parameters which describe the performance features which those routes have in common describe the QoS model that that cluster of routes offers in the network.

Cluster driven QoS model selection, in contrast to using only predefined models, operates by monitoring performance characteristics of flows of data through the network to identify classes of service that the network can support. This process may be made dynamic by an iterative learning process, in which various QoS metrics are measured for actual flows traversing the network. For example, a given flow may be associated with a performance metric vector $p=<m\_1, m\_2, \ldots m\_n>$. Each metric corresponds to a different feature of the flow (e.g. packet delay, packet loss, jitter etc.). The QoS Learning Module 116 then performs a clustering analysis on the measured metric vectors to identify representative metric vectors that indicate distinct network behaviours (these are referred to as prototypes). The representative metric vectors then form the basis of a dynamic set of QoS models that can be made available for use. For example, if the clustering algorithm identifies a number of flows that achieve similar levels of packet loss and similar levels of packet latency, a QoS model can be defined specifying the given loss and latency levels (e.g. as bounded ranges, or just upper limits). This QoS model can be made available for use by future packet flows, since the system knows from the observed prior behaviour that the network can support traffic with those characteristics. To determine the QoS models, the QoS Learning Module 116 may be configured to observe the traffic routes through the network (e.g. using telemetry data which may be forwarded over the network), and to determine Class of Service parameters for each route such as jitter, packet loss and packet delay. In other words, the QoS Learning Module 116 is operable to cluster the traffic routes based on these Class of Service parameters so that the routes in any given cluster can be characterised by a measure of central tendency in these parameters for that cluster of routes (e.g. a time average over a selected time interval, wherein the average may comprise a mean, median or mode). The QoS Learning Module 116 may also be configured to determine a measure of the deviation of these parameters amongst routes in the cluster (examples of measures of deviation include confidence intervals, quantiles, variance, standard deviation and higher order statistical moments). The QoS model may comprise a three-dimensional performance based model comprising jitter J, loss L and delay D. Accordingly, each such model $P_i$ can be characterised by a prototype vector $p_i=(j_i, l_i, d_i)$ and a confidence interval vector $c_i=(cj_i, cl_i, cd_i)$. The prototype vector $p_i$ specifies the typical or average performance and the confidence vector $c_i$ specifies a confidence interval p±c for each component p of $p_i$. An example of a confidence interval is a 99% confidence (e.g. 99% of the expected distribution will lie within ±c of the vector p, but other confidence intervals can be used).

FIG. 2A illustrates a set of prototype feature vectors. Here, each prototype vector includes metrics for the "jitter", "loss" and "delay" features. Whether or not the QoS models are predefined (or determined from a cluster driven approach as described below), the models may comprise data indicative of the spread of performance values across an identified cluster of which the prototype vector is representative. For example data indicative of spread may specify an expected deviation, perhaps in terms of confidence intervals. FIG. 2B illustrates a set of 99% confidence intervals for the prototype vectors of FIG. 2A. Together, a prototype vector and associated confidence vector can be used to specify the performance characteristics of a given QoS model.

FIG. 2C illustrates an example of a data table maintained by the system listing details of QoS models including prototypes, confidence intervals, available data capacity for each model, along with various statistics for the models. Each metric corresponds to a given feature of a traffic flow or of a QoS model.

When "learning" a QoS model, the system keeps a record of all routes that support the model (i.e. the routes carrying the data flows which were the basis for the model). Thus, in addition to the model definitions themselves, the learning process can produce a mapping that maps QoS models to routes. An example of a table providing such a mapping is illustrated in FIG. 2D. This mapping can be used to provide the "scoreboard" data advertised to clients at the gateway.

Clustering may be performed on any available number of features, so that the learnt QoS models may specify constraints on all features or on any subset of available features, leaving other features unspecified. The feature specification of a QoS model may be considered to constitute a form of Service Level Agreement (SLA), specifying the service level expected when transporting a data flow across the network. The features and associated metrics of a QoS model can relate to any measurable quantities associated with the network and how traffic is carried across the network. This includes both "hard" performance metrics, such as packet loss, packet jitter and packet delay, as well "soft" metrics such as:

energy consumption (e.g. an estimate of the energy consumed by carrying a packet or flow over a given route)

a cost value representing a financial cost involved in transport of a packet or flow across a route resilience (e.g. an expected rate of failure along a route, for example due to hardware failures, routers crashing and the like)

Some metrics (especially "soft" metrics e.g. cost), may be represented as a set of value bands rather than as a continuum of values, which can enable derivation of more useful and representative QoS models.

If dynamic updates of QoS models are desired, the QoS Learning Module 116 can continue to monitor data flows in the network, and repeat the described learning process at intervals (e.g. periodically or in response to some change in network conditions, or on an ad hoc basis). As a result the set of available QoS models may evolve over time, adapting to resource availability and demand in the network. However, such a dynamic system can make it more difficult for clients wishing to reserve resources for data flows to know what performance characteristics can be supported by the network at any given time. Furthermore, it may be the case that no single QoS model accurately represents the service characteristics desired by the client 102 at that time. A large number of QoS models may be discovered in this "cluster driven" manner.

The gateway can reduce the number of advertised QoS models to manage the number of models that are in use at a given time. In contrast to models which may be offered only to specific clients, this may enable general model management to be applied to all models available in the network. To reduce the number of advertised models, a subset of the available QoS models are selected from the large number of QoS models that might be generated by a "cluster driven" approach in a dynamic QoS environment. The gateway can then advertise only that subset to clients—e.g. only selected models may be made available on the "scoreboard".

The subset of models to be advertised by the gateway may be selected from the available set of QoS models based on criteria including one or more of the following:
1) Predictive model performance and stability.
2) Optimization of models based on desired traffic features.
3) Simplification of multiple models by reducing dimensionality.

Once the available models have been identified, the selection of a subset of those models for advertisement at the gateway may be performed by the QoS Learning Module 116. This selection may be performed according to one or more of the set of criteria mentioned above.

Figure 3:
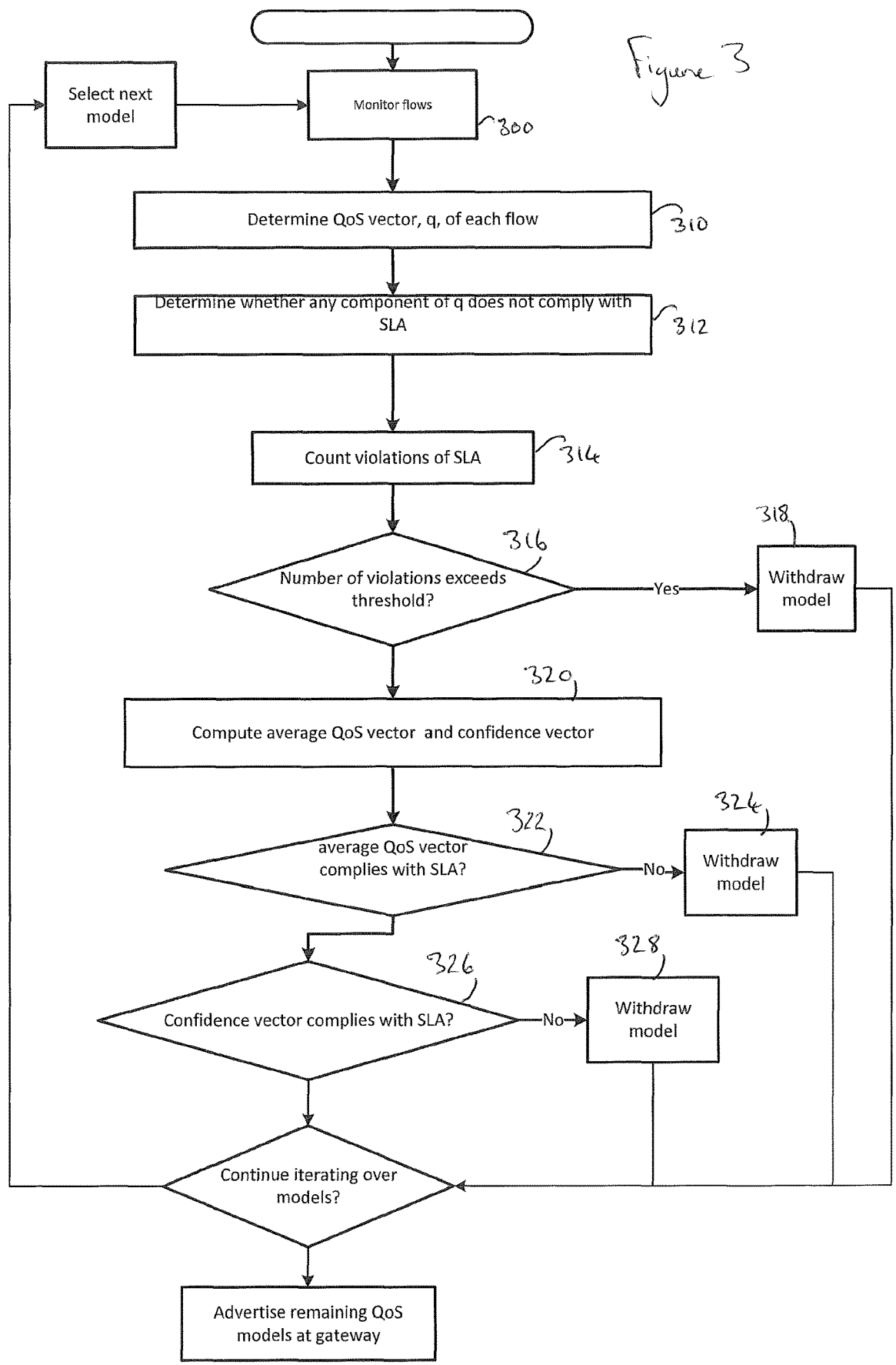
FIG. 3 illustrates a method of providing QoS models for use in a network.

FIG. 3 illustrates the selection of QoS models based on model performance and stability. According to methods such as those illustrated in FIG. 3, a QoS model may be retained, and advertised to clients at the gateway, only if the routes associated with that QoS model meet the performance requirements of the model to within selected tolerance limits—such as may be specified in a Service Level Agreement, SLA, between the network operator and the client 102. In the event that a QoS model does not meet this performance criterion it may be withdrawn by being excluded from the subset of QoS models that are made available to clients—e.g. it may no longer be advertised at the gateway.

One example of such a performance metric is the number of routes in the QoS model which are determined to deviate from the prototype, p, of the QoS model (cluster centre) by more than expected based on the confidence vector associated with that QoS model. In the event that more than a threshold number of routes exceed this deviation, the QoS Learning Module 116 may withdraw the QoS model from advertisement at the gateway. Another example of a performance based criterion is model stability. For example, the QoS Learning Module 116 may store data indicating the SLA associated with a QoS model, and may count the number of SLA breaches (failure to provide class of service within the SLA). This may identify models which oscillate between conformance to SLA and divergence from SLA over time, but which might do so without a large number of routes in the QoS model deviating from the prototype. Some or all of these performance criteria may be applied, and they may be applied in any selected order.

FIG. 3 illustrates one example of these performance criteria being combined. In this example, the QoS Learning Module 116 may monitor 300 the performance of each QoS model. This may be done at a specified time granularity (e.g. every 5 minutes, every hour etc.) according to network operator's preferences. This monitoring may comprise recording the number of flows using a particular model and their individual performance over a selected time interval. The aggregated performance of those flows and/or the individual performance of those flows over that time interval can be used to determine whether to advertise the associated QoS model at the gateway.

As illustrated in FIG. 3, the QoS Learning Module 116 monitors 300 each of the flows assigned to a specified model, P, for the selected time interval. During that interval, the QoS Learning Module 116 collects data indicating the performance of each of these flows against the QoS components offered by the model P. For example, if the model P is defined by reference to jitter, loss and packet delay, then the QoS Learning Module 116 collects that data about the cluster of flows assigned to that model. If however the model offers other components, then data indicating those components can be collected. Based on this data, the QoS Learning Module 116 then determines 310 a QoS vector, $q_i$ for each monitored flow during that time interval.

The QoS Learning Module 116 then determines 312, for each QoS vector, $q_i$, whether any component of the QoS vector, $q_i$, does not lie within the performance envelope agreed with the client 102 for the specified model P. For example—the agreed performance envelope of P may be based on the prototype, p, and the confidence vector, c. In this case, the QoS Learning Module 116 may determine whether the QoS vector, q, of each flow lies within the confidence interval specified by the QoS model prototype and confidence vector, p±c. This can be used to determine whether performance provided by flows under the model meets expectations for the QoS model, P, and to detect if there has been an SLA breach, e.g. if at least one component of $q_i$ is worse than the agreed threshold for that component. The QoS Learning Module 116 can also identify routes assigned to the model which exceed the SLA (e.g. provide better performance than the QoS standard specified by the model prototype and confidence). The QoS Learning Module 116 determines the number of such breaches (violations of the SLA) in a time interval 314. The QoS Learning Module 116 can then determine 316, based on the number of violations of the SLA (through under performance, or over performance, or both)—whether to withdraw the model from being offered by the gateway. In the event that there have been more than a selected number of breaches during this interval, the QoS model may be withdrawn 318.

The QoS Learning Module 116 can also determine 320 the average QoS vector Q. This may be done by computing the average of the QoS vectors $q_i$ of each of the cluster of flows assigned to that model. The QoS Learning Module 116 then determines 322 whether the average QoS vector Q lies within the confidence interval around the prototype of the QoS model P, e.g. is Q within the bounds of the model p±c? If that is not the case the QoS model may be withdrawn 324.

The QoS Learning Module 116 can also determine the confidence vector $c_q$ associated with the distribution of QoS components associated with each of the flows (the components of the QoS vectors $q_i$) about the average QoS vector Q. The QoS Learning Module 116 determines 326 whether one or more components of this confidence vector meet a selected condition. For example, the condition might be based on the prototype. For example the condition may be that one or more components of the confidence vector $c_q$ associated with the distribution is less than a selected fraction of a corresponding component of the QoS model's prototype, p—e.g $c_q$<xp, where x is a fractional deviation from the prototype. In the event that the confidence vector of this distribution does not meet this condition, the model may be deemed unacceptably 'volatile' and so withdrawn 328.

FIG. 4 shows an extract of a performance management table which might be produced by a method such as that described with reference to FIG. 3. As illustrated in FIG. 4 Model 1 was performing as expected at 15:00 and the only deviation from expected behaviour was that 3 flows were better than the agreed QoS. If this behaviour would persist and potentially grow, then the operator may withdraw the QoS model and replace it with a model that more accurately represents the high performance. However, it turns out that at 16.00 the model has actually become volatile resulting not only in better performance for some flows but also for SLA breaches for 2 flows. The decision would be to withdraw the QoS model at this stage or at least to consider it if the behaviour persists for a number of time slots.

Figure 5:
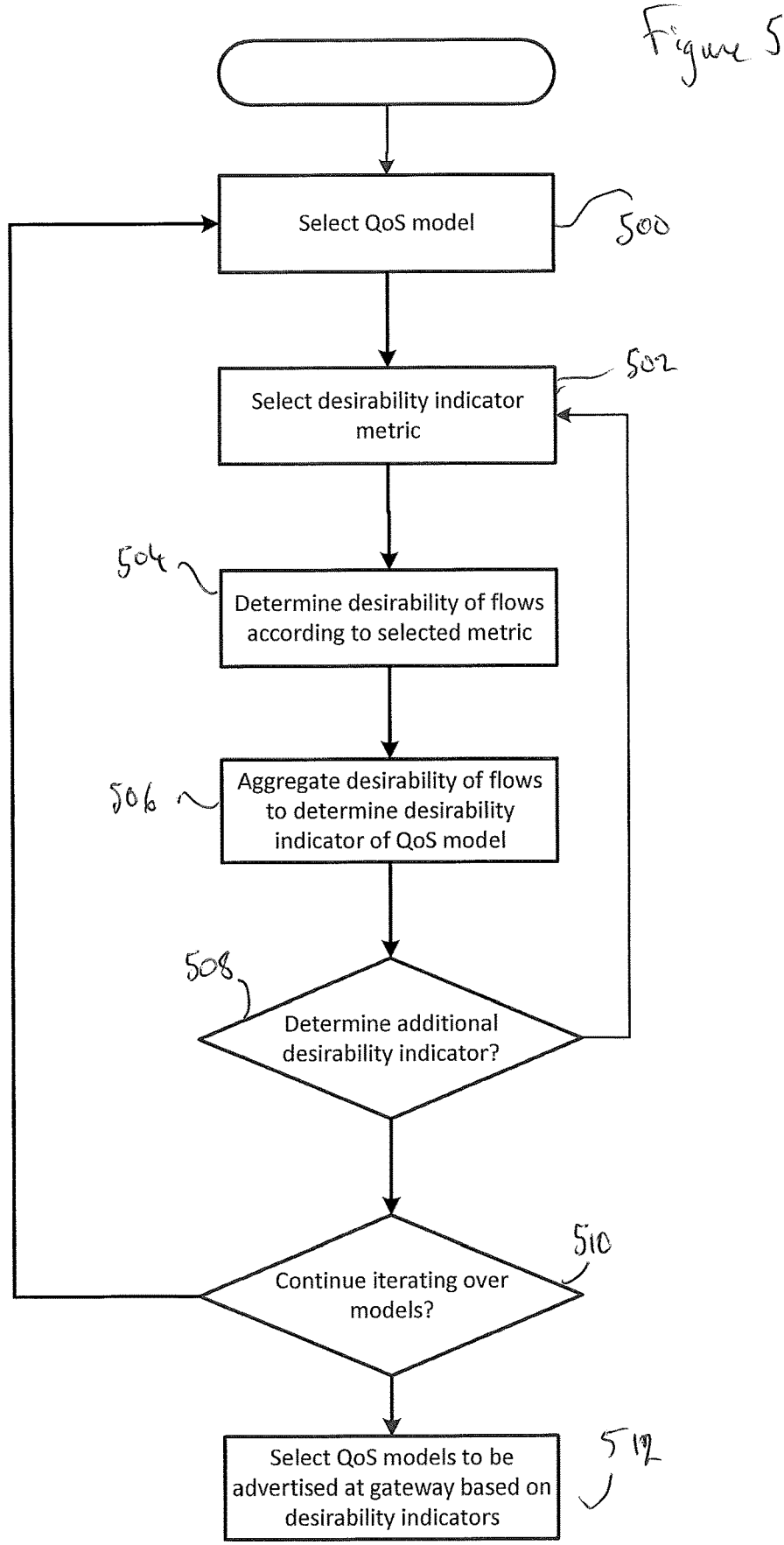
FIG. 5 illustrates another method of providing QoS models for use in a network.

FIG. 5 illustrates an approach which can be used in addition to, or as an alternative to the approach explained above with reference to FIG. 3 (selecting QoS models for advertisement based on performance and stability)

FIG. 5 illustrates an example of how QoS models may be selected so that the QoS models provided at the gateway promote 'desirable' traffic.

As shown in FIG. 5, to determine the desirability of the traffic being transported under each of the QoS models in the network, the QoS Learning Module 116 selects 500 a QoS model to be analysed. The QoS Learning Module 116 then selects 502 a desirability indicator metric. An example of a desirability indicator metric may be a cost metric of the traffic, such a cost metric may take into account at least one of: energy cost; bandwidth cost; financial cost; and revenue associated with that traffic.

The QoS Learning Module 116 then determines 504 the desirability indicator of each flow of traffic associated with the QoS model by applying the selected desirability indicator metric. This may be based on monitoring the flows over a period of time and determining the desirability of the traffic over that period—for example, if the metric is a cost metric, by logging the cost of data traffic flows associated with the QoS model.

The QoS Learning Module 116 then determines 506 an aggregate desirability score for the QoS model as a whole. In the case of a numerical indicator such as a cost metric, this aggregate may comprise a sum of the indicators of the flows associated with the QoS model. In the case of logical indicator metrics (such as whether certain conditions are met by the traffic flow) the aggregate may be based on some other combination operation (such as a logical AND or logical OR).

Additional desirability metrics may 508 also be determined for the QoS model by repeating the foregoing steps 500-506 using a different desirability indicator metric. The selected desirability indicator (or indicators) can be determined for each available QoS model by repeating 510 the process 500-508 for all of the available QoS models. Once the desirability indicators have been determined for the available QoS models, the gateway can select 512 which QoS models are to be advertised based on the desirability indicators of each of the QoS models. For example, the QoS Learning Module 116 may select QoS models to be advertised which have a desirability greater than some threshold level, or it may select the top N models and withdraw the others from being advertised at the gateway.

Where more than one desirability indicator has been determined, the QoS Learning Module 116 may combine these indicators to provide a combined desirability score.

Desirability metrics can be based on any feature that identifies desired traffic. Each traffic flow that is mapped to a QoS model can be characterised by such a feature, for example, revenue, energy usage, type of traffic or application (if packet inspection is available), disruptive behaviour (e.g. sending more than agreed), congestion, duration of transmission, amount of data transmitted etc. These values may be aggregated by model and route and/or by model only. Such a measure may be obtained for each model on each route, or just for each model. The desirability indicator for each model may be based on this measure such that models supporting desired traffic are scored more highly (e.g. appear at the top of the list advertised at the gateway).

Models may be local, for example they may not be offered in the entire network, but only between specific source and destination addresses, or groups of such addresses. As a result, they may only be present on a small number of routes. Such models that are used only on a small number of routes may be treated differently from global models. For example, a relative measure of their desirability may be determined by dividing another computed desirability value by the number of routes a model appears on. This may enable models which are used on smaller numbers of routes to be maintained even if their desirability indicator would otherwise be too low.

FIG. 6 illustrates an example of a method such as that explained above with reference to FIG. 5 in which two desirability indicator metrics have been applied. As illustrated in FIG. 6, the two desirability metrics have been applied to each of a plurality of QoS models, each comprising at least one route. In this illustration, the first desirability indicator is the amount of data (e.g. the operator prefers QoS models that attract traffic that transmit a lot of data). The second metric shown in FIG. 6 is the percentage of traffic which suffers at least some congestion. Congestion may be defined as a greater than threshold packet delay, or a greater than threshold percentage of packet loss.

As these are both numerical metrics they may be combined numerically, for example using a metric which ranks a first metric (e.g. high data amount) as desirable, and a second metric (e.g. congestion) as undesirable. For example the measures can be combined as follows (Avg. data amount per route per hour)×(1−% traffic congested/100). If applied to the data illustrated in FIG. 6, this results in the following ranking: M2: 13.5, M1: 9, M3: 8.5, M4: 4, M5: 3.8, M6: 3.6. The model that is only applicable to two routes turns out on top because it has the best per route behaviour.

The operator can now decide to keep only the, for example, 3 best models or re-allocate the resources allotted to the withdrawn models between the remaining models according to their ranking or their desirability indicator values.

To protect QoS models which may apply to only small numbers of routes, the desirability indicator metrics may be determined per route—e.g. the average desirability of each route in the QoS model. In the data illustrated in FIG. 6, such an approach may enable model M2 to continue to be supported because it still creates sufficient benefit in the local region. Models such as M2 that are only applicable to a small number of routes can indeed be deliberate. Therefore, embodiments of the disclosure may be configured to protect selected models from withdrawal (and to continue to advertise them) even in the event that they do not meet a desirability criterion such as a threshold desirability or ranking. This may protect models of local benefit, such as those which operate only on a small number of routes. The QoS Learning Module 116 may be configured to apply a different measure to these selected models (e.g. a desirability indicator which takes into account the desirability per route—such as average amount of data in a given period per route). This may enable QoS models of local benefit to be maintained whilst also managing local models in the same (or at least a compatibly similar way as the global models).

Irrespective of what this 'desired' feature might be, the QoS Learning Module 116 can evaluate the available QoS models according to this 'desirability' criterion and choose the selection of QoS models to be advertised at the gateway so as to increase this 'desirability' value. An indicator of the 'desirability' of the QoS models can be determined based on traffic being transported according to those models during a selected time interval. Desirability indicators may be determined based on at least one of: an identifier of a client 102 associated with the network traffic; and secondary data assigned to the network traffic. Such secondary data may comprise one of: a metric of adverse impact to other service, a metric of the stability of routes followed by that traffic through the network; and data selected, based on a parameter of the traffic, from a stored association. Such a stored association may indicate client 102 specific or traffic specific data, such as the application that that traffic is intended to support, or transport cost data associated with that traffic. Transport cost data may comprise energy cost and/or transport pricing associated with the traffic. This may enable particular applications, such as video conferencing or other delay sensitive traffic to be prioritised, it may also permit the desirability of traffic to be based on the financial cost of that traffic. Whatever the basis of these desirability indicators, they may be obtained by determining for each QoS model of the plurality of QoS models the desirability of traffic belonging to the each QoS model. The QoS models advertised to clients at the gateway can then be selected based on this desirability indicator.

As mentioned above, the desirability indicator for a QoS model may be based on a metric of adverse impact to other services. This metric may be obtained by monitoring network congestion after traffic using that QoS model is admitted to the network. For example, the metric may be based on the frequency of network congestion events. Network congestion events may comprise packet loss or packet delay which exceeds a threshold level.

In addition to, or as an alternative to approaches such as those described above with reference to FIG. 3 and FIG. 5, yet a third approach may be used to reduce the number of models advertised by the Gatekeeper 104. This third approach is based on simplifying a number of classes of service into a single QoS model by reducing the dimensionality of the model features. This may be achieved by identifying QoS models having one or more identical parameters in their prototype (e.g. parameters which having confidence intervals which overlap). Client requirements may also be taken into account. Consider the example that a number of QoS models all offer a matrix of components (e.g. {jitter, loss, delay}) and only one component varies between those models. In the event that requests for QoS models received from clients do not specify that component, then those QoS models can all be replaced with a single model. The component which varied between the original (redundant) models may not be specified at all, or may be specified with an appropriately wide confidence interval.

Figure 7:
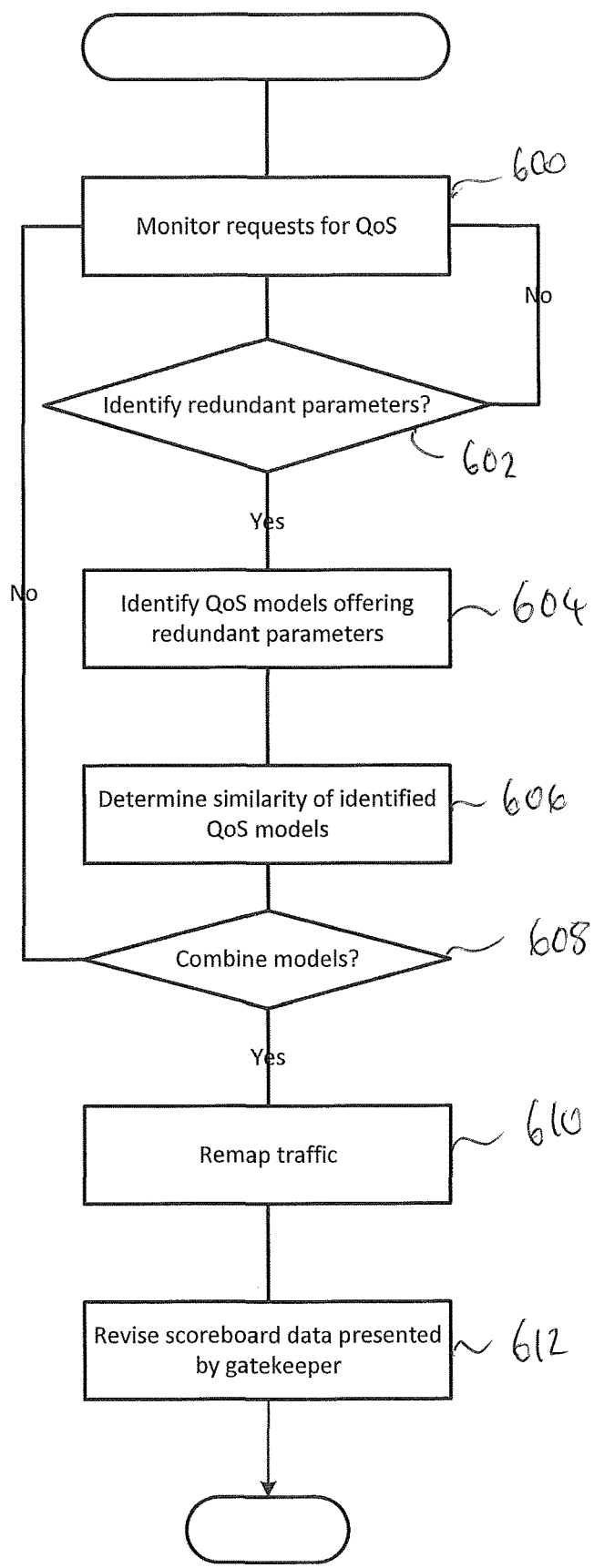
FIG. 7 illustrates another method of providing QoS models for use in a network.

FIG. 7 illustrates one such method. As illustrated in FIG. 7, the QoS Learning Module 116 monitors 600 requests received for QoS at the Gatekeeper 104. The QoS Learning Module 116 may record these requests to assemble demand statistics indicating the frequency with which client 102 requests for QoS indicate a requirement for specific QoS components.

The QoS Learning Module 116 then determines 602, based on these demand statistics, whether any class of service components being offered in QoS models at the gateway are redundant. For example, if the frequency with which clients requests specify a class of service component is less than a threshold level, that class of service component may be identified as redundant.

In the event that a redundant component is identified 602, the QoS Learning Module 116 checks the QoS models, and identifies 604 models which offer the redundant component. These QoS models may then be modified by pruning the redundant component from the features of those models. This simplification may reduce the communication overhead for model negotiation and may reduce the amount of information that needs to be stored and updated for the management of models. By pruning models in this way it is possible that a number of models can become identical or very similar to each other and can be combined into a single model. For example, if more than one QoS model, before pruning, offered a specified level of the redundant class of service component, the QoS Learning Module 116 may check 606 whether the other components of those QoS models differ from each other. For example it may check 606 whether any difference is significant in view of confidence vector elements for those components of the model. For example the components may be deemed to differ if the difference between them is greater than one or more of the confidence intervals, or if the confidence intervals do not overlap, or if a component of one model does not fall within the confidence interval of that component in another one of the models. If the other components do not differ, the QoS Learning Module 116 consolidates them by replacing 608 the two identical or overlapping QoS models with a single QoS model.

The Gatekeeper 104 can then reassign 610 the traffic flows from the deleted QoS models onto the QoS model which replaces them.

The Gatekeeper 104 can also then revise 612 the QoS models advertised to clients at the gateway so that a single model is offered to clients in place of the deleted overlapping models.

As one specific example of such a method—consider the following three performance models and their prototypes (jitter, loss, delay): M1: (3, 0.15, 25); M2: (2.9, 0.10, 20); M3: (3.1, 0.2, 25).

Assume that the widths of the confidence intervals for all three dimensions are ±5% and that the QoS Learning Module 116 discovered that QoS on the loss feature is not requested by clients.

By removing the loss component we obtain
M1': (3, 25); M2': (2.9, 20); M3': (3.1, 25).

We can see that M1' and M3' are almost identical and only differ by 0.1 in the jitter component which is about 3.3% difference which is within the 5% acceptable distance specified by the confidence intervals. We combine M1' and M3' to M1": (3.05, 25) and re-compute the confidence vector for this model to make sure that it is still within acceptable limits. A combination with M2' is not possible, because its delay component differs by 25% from M1" which is well outside the acceptable performance difference of 5%. Therefore M2' remains as a model.

We can then remap all traffic using the original M1 and M3 to M1" and traffic using M2 to M2'.

This can be done by relabelling traffic at its point of ingress to the network.

Removing a component from a performance model can be done if no client 102 or too few clients request it, but also if the network performance has deteriorated in this feature and the operator can no longer guarantee QoS for it. Instead of withdrawing all performance models using the deteriorated feature, we can prune it away from the models and keep advertising the resulting lower dimensional models. The model simplification can be run on a per route basis or across parts of the network, for example across all of the network. It may be better to run it globally to avoid model proliferation as a result of some models being combined on some routes and not on others.

Note that the above three criteria can be combined together in any way. For example, in some embodiments the consolidation of models described above may be applied only to QoS models having desirability of less than a selected level, or it may be applied to QoS models which have low or unstable performance (frequent breaches of SLA at a route level or at a model level) and/or being associated with more than a threshold number of routes in the network. Alternatively, consolidation of models can be applied to all available models irrespective of their performance. In some embodiments however, QoS models may only qualify for consolidation if its performance is deemed to be stable (according to one or more of the performance measurements described above with reference to FIG. 3). Provided that the performance is sufficiently good and/or sufficiently stable after which methods such as those described above with reference to FIG. 5 and FIG. 7 can be applied to withdraw further models if necessary.

Figure 8:
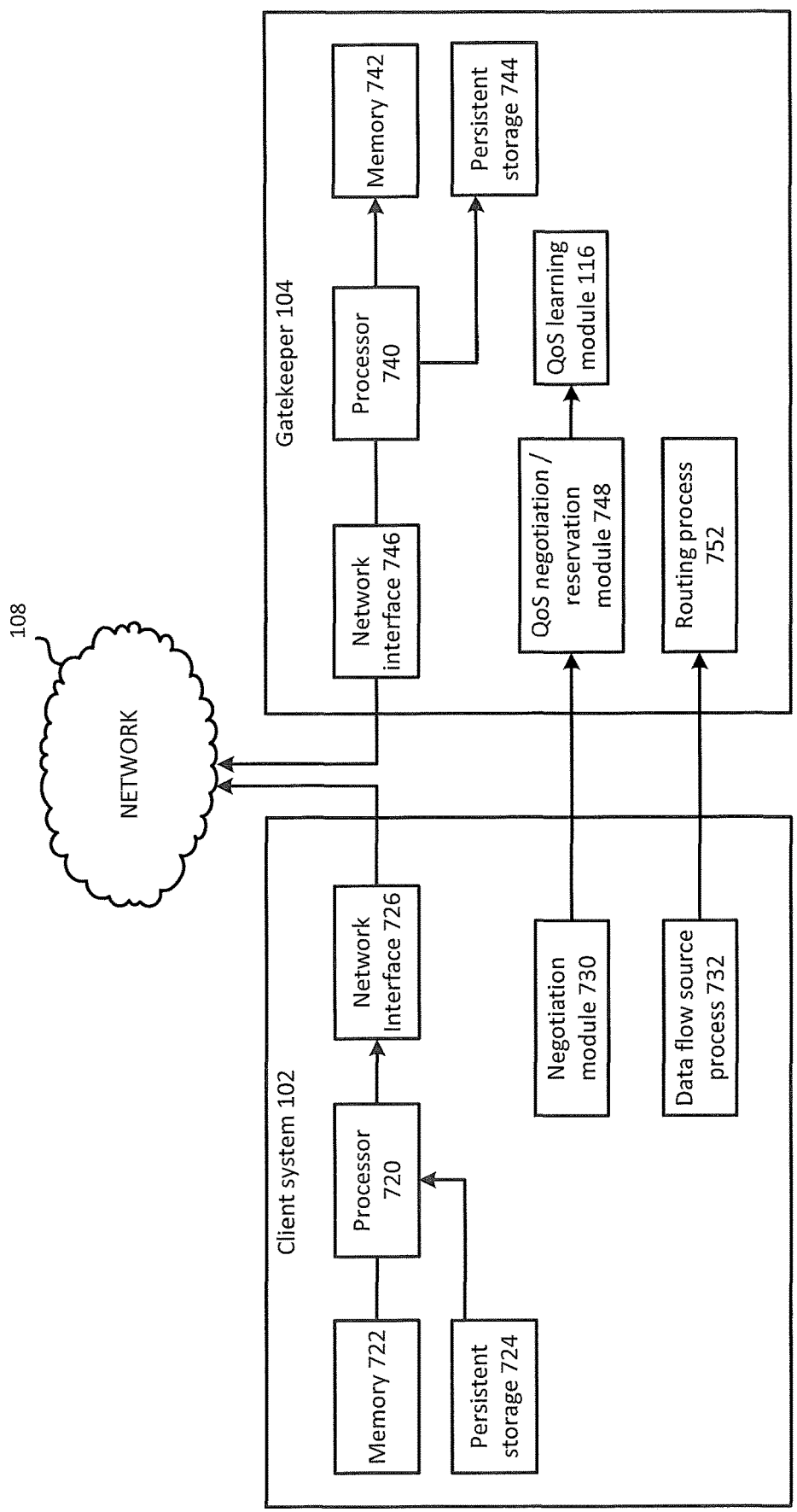
FIG. 8 illustrates hardware/firmware/software architectures for components of a system for implementing methods described herein.

FIG. 8 illustrates by way of example a possible hardware/software/firmware architecture of the client 102 and Gatekeeper 104 components of the system.

The client system 102 (e.g. a server originating a data flow that is to be transmitted across the network) includes one or more processors 720 together with volatile/random access memory 722 for storing temporary data and software code being executed. A network interface 726 is provided for communication with other system components (including Gatekeeper 104) over one or more networks 108 (e.g. Local or Wide Area Networks, including the Internet).

Persistent storage 724 (e.g. in the form of hard disk storage, optical storage, solid state storage and the like) persistently stores software for implementing the methods described previously, including a negotiation module 730 for participating in the QoS negotiation process and a data flow source process 732 for generating and/or forwarding the data flow that is to be subject to the negotiated QoS. The persistent storage also includes other typical server software and data (not shown), such as a server operating system.

The client system 102 may include other conventional hardware components as known to those skilled in the art (e.g. I/O devices), and the components are interconnected by a data bus (this may in practice consist of several distinct buses such as a memory bus and I/O bus).

The Gatekeeper 104 may comprise conventional server hardware, including memory 742 and persistent storage media 744 (e.g. magnetic/optical/solid state disk storage), both for storing computer-executable software code and data, one or more processors 740 for executing software and a network interface 746 for communication with external networks 108.

The processor runs software modules including the QoS Learning Module 116 which implements the learning algorithms for dynamically discovering QoS models based on monitored data flow statistics, and creates a database of QoS models and model-to-route mappings for storage e.g. in memory 742 and/or persistent storage 744.

The processor 740 further runs a QoS negotiation/reservation module 748 for implementing the Gatekeeper's negotiation and reservation functions, based on the QoS model information and route information stored in persistent storage 744 and/or memory 742. The negotiation module 748 communicates with the corresponding module 730 at client system 102 via the network to implement the described negotiation protocol.

In the case that the Gatekeeper 104 additionally performs traffic forwarding, the Gatekeeper 104 may also run routing process 752 for routing traffic tagged with a given negotiated QoS that is received from the client system 102 (in particular data flow source process 732) onto assigned routes and performing load balancing and the like. Alternatively, traffic routing based on the negotiated QoS could be performed at external routing devices (e.g. the edge routers of FIG. 1).

The persistent storage also includes other typical server software and data (not shown), such as a server operating system. The Gatekeeper 104 may include other conventional hardware components, with components interconnected via a bus, as described for client system 102. Note that where the Gatekeeper 104 implements routing functions, other conventional router software and hardware may be included, such as a set of interconnected line interface cards and a router operating system.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

There are different types of cluster analysis that can be used to learn model prototypes. One possibility is to use a centroid-based clustering method like k-means clustering or variations thereof like fuzzy c-means clustering (see for example Frank Höppner, Frank Klawonn, Rudolf Kruse, and Thomas Runkler. *Fuzzy Clustering*. Wiley, 1999). Centroid based clustering algorithms need to solve the problems of assigning initial prototypes or cluster centres and determining the optimal number of cluster centres. Initial prototypes may be picked at random from the set of training data. The optimal number of clusters can be determined by repeatedly clustering the training data with increasing number of clusters until the result does no longer improve. The quality of a clustering result can be determined by relating the intra- to the inter-cluster distances. Centroid-based clustering is however only one possible way of obtaining model prototypes representing naturally occurring groups in the QoS data of data transmissions. It will be appreciated in the context of the present disclosure that model prototypes can also be learned by other types of clustering algorithms like distribution-based or density-based approaches or by methods known from artificial neural networks like self-organising maps (see for example Rosaria Silipo. Neural Networks. In: Michael Berthold and David J. Hand (eds). Intelligent Data Analysis. Springer, Berlin, 1999, pp 217-268.) In addition to identifying prototypes through cluster analysis, the gateway may also be configured to offer predetermined QoS models—these may comprise default QoS models that a network operator wishes to offer. For these prototypes, the QoS Learning Module 116 may need only to compute confidence vectors—the prototypes themselves need not be changed through cluster analysis. It will therefore be appreciated that the routes and associated QoS models may be identified using a cluster driven approach, or they may be predetermined, or they may comprise a mixture of predetermined and cluster driven models.

The selection of models according to the criteria and metrics described herein may be performed by the QoS Learning Module 116 as described above, or by the gateway itself, or by a separate logical entity (which may comprise logic, and which may be embodied in software, firmware or a combination thereof). The selection may be performed at intervals, for example periodically. Human intervention may not be required in this process.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein, such as the QoS Learning Module 116 and the Gatekeeper 104 may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software code, electronic instructions, flash memory, optical disks, CD-ROMs, DVD ROMs, magnetic or optical cards, other types of machine-readable mediums suitable for storing electronic instructions, or any suitable combination thereof.

The functionality of the QoS Learning Module 116 and the Gatekeeper 104 may be provided in a single integrated unit, or it may be distributed between a number of processors, which may be arranged to communicate over a network. This may enable, for example, the processing steps of the methods described herein to be performed by devices which are distributed throughout a network—for example parts of one or more nodes of the network may cooperate to provide this functionality.

In the context of the present disclosure other examples and variations of the devices and methods described herein will be apparent to a person of skill in the art. Other examples and variations are within the scope of the disclosure, as set out in the appended claims.

The invention claimed is:

1. A method of providing Quality of Service, QoS, models for use in a network, the method comprising:
    obtaining data describing a plurality of QoS models, each QoS model comprising at least one QoS component specifying a characteristic of network traffic to be provided by the QoS model, and each QoS model being associated with a performance envelope p±c, where p is a vector of values specifying a model prototype and c is a confidence vector indicating the expected variation in the at least one QoS component specified by the model prototype p;
    monitoring network traffic to obtain a plurality of indicators, each indicating a characteristic of the network traffic associated with a corresponding one of the plurality of QoS models, the monitoring comprising:
        collecting data about a plurality of flows of network traffic associated with each of the plurality of QoS models, and
        determining, based on the data, a QoS vector $q_i$, for each of the plurality of flows assigned to that QoS model, and determining an average QoS vector Q for that QoS model based on an average of the QoS vectors $q_i$, for each of the plurality of flows;
    selecting, based on the plurality of indicators, the average QoS vector Q and the performance envelope p±c, a subset of the plurality of QoS models; and
    providing data identifying the subset of QoS models to a client device to enable the client device to send data over the network according to a selected one of the subset of QoS models.

2. The method of claim 1 wherein the indicators each comprise the number of routes associated with the corresponding QoS model in which the characteristic of the network traffic deviates from the corresponding QoS model by more than a selected threshold deviation.

3. The method of claim 1 comprising:
    receiving a query message from a client the query message specifying one or more quality-of-service (QoS) requirements;
    wherein providing data identifying the subset of QoS models comprises responding to the query message by transmitting a query response message comprising QoS models selected from the subset of QoS models.

4. The method of claim 1 wherein the indicators comprise stability indicators and each stability indicator is determined by comparing the monitored network traffic with the corresponding one of the plurality of QoS models.

5. The method of claim 1 wherein the selecting of the subset of the plurality of QoS models based on the average QoS vector Q and the performance envelope p±c includes determining whether the average QoS vector Q is within the performance envelope p±c.

6. The method of claim 5 wherein the selecting of the subset of the plurality of QoS models excludes a QoS model whose average QoS vector Q is outside of the performance envelope p±c.

7. A non-transitory computer storage medium storing program instructions configured to program a processor of a network device to perform a method of providing Quality of Service, QoS, models for use in a network, the method comprising:
    obtaining data describing a plurality of QoS models, each QoS model comprising at least one QoS component specifying a characteristic of network traffic to be provided by the QoS model, and each QoS model being associated with a performance envelope p±c, where p is a vector of values specifying a model prototype and c is a confidence vector indicating the expected variation in the at least one QoS component specified by the model prototype p;
    monitoring network traffic to obtain a plurality of indicators, each indicating a characteristic of the network traffic associated with a corresponding one of the plurality of QoS models, the monitoring comprising:

collecting data about a plurality of flows of network traffic associated with each of the plurality of QoS models, and determining, based on the data, a QoS vector $q_i$, for each of the plurality of flows assigned to that QoS model, and determining an average QoS vector Q for that QoS model based on an average of the QoS vectors $q_i$, for each of the plurality of flows;

selecting, based on the plurality of indicators, the average QoS vector Q and the performance envelope p±c, a subset of the plurality of QoS models; and providing data identifying the subset of QoS models to a client device to enable the client device to send data over the network according to a selected one of the subset of QoS models.

8. The non-transitory computer storage medium of claim 7 wherein the selecting of the subset of the plurality of QoS models based on the average QoS vector Q and the performance envelope p±c includes determining whether the average QoS vector Q is within the performance envelope p±c.

9. The non-transitory computer storage medium of claim 8 wherein the selecting of the subset of the plurality of QoS models excludes a QoS model whose average QoS vector Q is outside of the performance envelope p±c.

10. An apparatus comprising one or more processors for executing software, such that the apparatus is at least configured to:

obtain data describing a plurality of QoS models, each QoS model comprising at least one QoS component specifying a characteristic of network traffic to be provided by the QoS model, and each QoS model being associated with a performance envelope p±c, where p is a vector of values specifying a model prototype and c is a confidence vector indicating the expected variation in the at least one QoS component specified by the model prototype p;

monitor network traffic to obtain a plurality of indicators, each indicating a characteristic of the network traffic associated with a corresponding one of the plurality of QoS models, the monitoring comprising:

collecting data about a plurality of flows of network traffic associated with each of the plurality of QoS models, and determining, based on the data, a QoS vector $q_i$, for each of the plurality of flows assigned to that QoS model, and determining an average QoS vector Q for that QoS model based on an average of the QoS vectors $q_i$, for each of the plurality of flows;

select, based on the plurality of indicators, the average QoS vector Q and the performance envelope p±c, a subset of the plurality of QoS models; and provide data identifying the subset of QoS models to a client device to enable the client device to send data over the network according to a selected one of the subset of QoS models.

11. The apparatus of claim 10 wherein the indicators each comprise the number of routes associated with the corresponding QoS model in which the characteristic of the network traffic deviates from the corresponding QoS model by more than a selected threshold deviation.

12. The apparatus of claim 10 wherein the apparatus is further configured to:

receive a query message from a client the query message specifying one or more quality-of-service (QoS) requirements;

provide data identifying the subset of QoS models by responding to the query message by transmitting a query response message comprising QoS models selected from the subset of QoS models.

13. The apparatus of claim 10 wherein the indicators comprise stability indicators and each stability indicator is determined by comparing the monitored network traffic with the corresponding one of the plurality of QoS models.

14. The apparatus of claim 10 wherein selection of the subset of the plurality of QoS models based on the average QoS vector Q and the performance envelope p±c includes a determination of whether the average QoS vector Q is within the performance envelope p±c.

15. The apparatus of claim 14 wherein the selection of the subset of the plurality of QoS models excludes a QoS model whose average QoS vector Q is outside of the performance envelope p±c.

* * * * *